US011331653B2

(12) United States Patent
Patchett et al.

(10) Patent No.: US 11,331,653 B2
(45) Date of Patent: May 17, 2022

(54) COMBINED NOX ABSORBER AND SCR CATALYST

(71) Applicant: BASF CORPORATION, Florham Park, NJ (US)

(72) Inventors: Joseph A Patchett, Basking Ridge, NJ (US); Xinyi Wei, Princeton, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/844,048

(22) Filed: Apr. 9, 2020

(65) Prior Publication Data
US 2020/0230582 A1 Jul. 23, 2020

Related U.S. Application Data

(63) Continuation of application No. PCT/IB2018/057946, filed on Oct. 12, 2018.

(60) Provisional application No. 62/571,427, filed on Oct. 12, 2017.

(51) Int. Cl.
| | |
|---|---|
| *B01D 53/94* | (2006.01) |
| *B01J 29/072* | (2006.01) |
| *B01J 29/068* | (2006.01) |
| *B01J 23/10* | (2006.01) |
| *B01J 23/58* | (2006.01) |
| *B01J 23/22* | (2006.01) |
| *B01J 35/00* | (2006.01) |
| *B01J 35/04* | (2006.01) |
| *F01N 3/08* | (2006.01) |
| *F01N 3/035* | (2006.01) |
| *F01N 3/20* | (2006.01) |
| *F01N 3/28* | (2006.01) |

(52) U.S. Cl.
CPC ........ *B01J 29/072* (2013.01); *B01D 53/9418* (2013.01); *B01D 53/9481* (2013.01); *B01J 23/10* (2013.01); *B01J 23/22* (2013.01); *B01J 23/58* (2013.01); *B01J 29/068* (2013.01); *B01J 35/0006* (2013.01); *B01J 35/04* (2013.01); *F01N 3/035* (2013.01); *F01N 3/0814* (2013.01); *F01N 3/0842* (2013.01); *F01N 3/2066* (2013.01); *F01N 3/2825* (2013.01); *F01N 3/2828* (2013.01); *B01D 2255/2042* (2013.01); *B01D 2255/20707* (2013.01); *B01D 2255/20723* (2013.01); *B01D 2255/40* (2013.01); *B01D 2255/50* (2013.01); *B01D 2255/91* (2013.01); *B01D 2255/9155* (2013.01); *F01N 2370/04* (2013.01); *F01N 2610/1453* (2013.01)

(58) Field of Classification Search
CPC ............ B01D 53/9409; B01D 53/9413; B01D 53/9418; B01D 53/9422; B01D 53/9468; B01D 53/9472; B01D 53/53; B01D 53/9481; B01D 2255/91; B01D 2257/402; B01D 2257/404; B01D 2258/012; F01N 3/0814; F01N 3/0842; F01N 3/2066; F01N 2250/12; F01N 2570/14
See application file for complete search history.

(56) References Cited

U.S. PATENT DOCUMENTS

| | | |
|---|---|---|
| 4,518,710 A | 5/1985 | Brennan et al. |
| 5,137,855 A | 8/1992 | Hegedus et al. |
| 5,476,828 A | 12/1995 | Kapteijn et al. |
| 5,750,082 A | 5/1998 | Hepburn et al. |
| 6,753,294 B1 | 6/2004 | Brisley et al. |
| 7,062,904 B1 | 6/2006 | Hu et al. |
| 7,220,692 B2 | 5/2007 | Marshall et al. |
| 8,101,146 B2 | 1/2012 | Fedeyko et al. |
| 8,105,559 B2 | 1/2012 | Melville et al. |
| 8,119,088 B2 | 2/2012 | Boorse et al. |
| 8,293,182 B2 | 10/2012 | Boorse et al. |
| 8,592,337 B2 | 1/2013 | Holgendorff et al. |
| 8,475,752 B2 | 7/2013 | Wan et al. |
| 8,685,882 B2 | 4/2014 | Hong et al. |
| 8,715,618 B2 | 5/2014 | Turkhan et al. |
| 9,011,807 B2 | 4/2015 | Mohanan et al. |
| 9,101,908 B2 | 8/2015 | Jurng et al. |
| 9,114,385 B2 | 8/2015 | Briskley et al. |
| 9,138,732 B2 | 9/2015 | Bull et al. |

(Continued)

FOREIGN PATENT DOCUMENTS

| | | |
|---|---|---|
| EP | 1133355 A1 | 9/2001 |
| EP | 1889651 A1 | 2/2008 |

(Continued)

OTHER PUBLICATIONS

European Search Report dated Jun. 15, 2021.

*Primary Examiner* — Timothy C Vanoy

(74) *Attorney, Agent, or Firm* — Vincent Sica

(57) ABSTRACT

The present invention is directed to selective catalytic reduction catalysts that combine SCR activity with NOx absorber activity. In particular, the disclosed catalytic article includes a substrate having a first and a second material disposed thereon, wherein the first material includes a selective catalytic reduction (SCR) catalyst composition and the second material includes a nitrogen oxides (NOx) absorber composition, wherein the NOx absorber composition does not substantially oxidize ammonia, and wherein the catalytic article is effective to abate NOx from an engine exhaust gas stream. Emission treatment systems for treating an exhaust gas including a catalytic article of the invention are provided, particularly systems that include an injector adapted for the addition of ammonia to the exhaust gas stream located upstream of the catalytic article.

20 Claims, 7 Drawing Sheets

(56) References Cited

U.S. PATENT DOCUMENTS

| | | |
|---|---|---|
| 9,199,195 B2 | 12/2015 | Andersen et al. |
| 9,321,009 B2 | 4/2016 | Wan et al. |
| 9,352,307 B2 | 5/2016 | Stiebels et al. |
| 9,480,976 B2 | 11/2016 | Rivas-Cardona et al. |
| 9,486,791 B2 | 11/2016 | Swallow et al. |
| 9,610,564 B2 | 4/2017 | Xue et al. |
| 9,662,611 B2 | 5/2017 | Wan et al. |
| 2001/0049339 A1 | 12/2001 | Schafer-Sindelindger et al. |
| 2002/0077247 A1 | 6/2002 | Bender et al. |
| 2004/0076565 A1* | 4/2004 | Gandhi ............... F01N 13/0097 423/235 |
| 2004/0175315 A1 | 9/2004 | Brisley et al. |
| 2008/0026932 A1 | 1/2008 | Satoh et al. |
| 2011/0305615 A1 | 12/2011 | Hilgendorff |
| 2012/0275977 A1 | 11/2012 | Chandler et al. |
| 2015/0157982 A1 | 6/2015 | Rajaram et al. |
| 2015/0158019 A1 | 6/2015 | Rajaram et al. |
| 2015/0238934 A1 | 8/2015 | Blakeman et al. |
| 2016/0038878 A1 | 2/2016 | Sonntag et al. |
| 2016/0136626 A1 | 5/2016 | Phillips et al. |
| 2016/0228852 A1 | 8/2016 | Biberger et al. |

FOREIGN PATENT DOCUMENTS

| | | |
|---|---|---|
| WO | WO 2009/135014 A2 | 11/2009 |
| WO | WO 2016/141142 | 9/2016 |

\* cited by examiner

COMBINED NOX ABSORBER AND SCR CATALYST

CROSS-REFERENCE TO RELATED APPLICATIONS

This application is a continuation of International Application No. PCT/IB2018/057946 filed Oct. 12, 2018, which International Application was published by the International Bureau in English on Apr. 18, 2019, and which claims priority to U.S. Provisional Application No. 62/571,427 filed Oct. 12, 2017, the content of each of which is hereby incorporated by reference in its entirety.

FIELD OF THE INVENTION

The present invention relates generally to the fields of selective catalytic reduction (SCR) catalysts and nitrogen oxides (NOx) absorbers, as well as to methods of preparing and using such catalysts in the treatment of a NOx-containing exhaust gas stream.

BACKGROUND OF THE INVENTION

Nitrogen oxides, (NOx) are harmful components of atmospheric pollution. NOx is contained in exhaust gases, such as from internal combustion engines (e.g., in automobiles and trucks), from combustion installations (e.g., power stations heated by natural gas, oil, or coal), and from nitric acid production plants.

Various treatment methods are used to lower NOx (i.e., NO and $NO_2$) in exhaust gases and thus decrease atmospheric pollution. One type of treatment involves catalytic reduction of nitrogen oxides using a reductant such as hydrocarbons or ammonia. Using ammonia or an ammonia precursor in combination with a suitable catalyst can achieve a high degree of nitrogen oxide removal with a minimum amount of reducing agent. This is referred to as selective catalytic reduction since the reductant, e.g., ammonia ($NH_3$), reacts almost exclusively with the NOx.

The selective reduction process using ammonia is referred to as a $NH_3$-SCR (Selective Catalytic Reduction) process or often just as SCR. The SCR process uses catalytic reduction of nitrogen oxides with a reductant (e.g., ammonia ($NH_3$) or ammonia precursor) in the presence of atmospheric oxygen, resulting in the formation predominantly of nitrogen ($N_2$) and steam ($H_2O$):

  (standard SCR reaction)

  (slow SCR reaction)

  (fast SCR reaction)

The SCR process is one of the most viable techniques for the removal of nitrogen oxides from engine exhaust gas. In a typical exhaust gas, the nitrogen oxides are mainly composed of NO (>90%), which is converted by the SCR catalyst into nitrogen and water in the presence of ammonia (standard SCR reaction). Ammonia is one of the most effective reductants although urea can also be used as an ammonia precursor.

Generally, catalysts employed in the SCR process have good catalytic activity at higher operating temperatures (i.e., from about 200° C. to 600° C.) but are much less efficient at lower operating temperatures. Lower operating temperatures typically occur after engine start up and during the engine and catalyst warm up. This time period is generally called the "cold start" period, where the operating temperature of the exhaust gas treatment system upon activation is too low to initially display sufficient catalytic activity to effectively treat hydrocarbons (HCs), nitrogen oxides (NOx) and/or carbon monoxide (CO) present in the engine exhaust gas. Various trapping systems (e.g., NOx absorbers) are employed during this cold start period to store the initial exhaust gas emissions expelled from the engine only to then subsequently release them (i.e., HC, CO and NOx gases) at higher temperatures, when the catalytic components (e.g., SCR catalyst) of the engine treatment system have attained sufficient catalytic activity.

For example, NOx absorbers are used to trap NOx at temperatures below 200° C. and release NOx at temperatures exceeding 200° C. These materials typically comprise an alkaline earth metal (such as Ba, Ca, Sr, and Mg) oxide or cerium oxide and form an inorganic nitrate (for example, BaO or $BaCO_3$ is converted to $Ba(NO_3)_2$) when adsorbing NOx gases at low temperatures. At higher temperatures the inorganic nitrate decomposes to NO and/or $NO_2$, releasing them back into the exhaust gas stream. NOx absorbers are generally located as a separate catalytic component upstream of the SCR catalyst in an engine treatment system. Often the operating temperature of the NOx absorber and the SCR catalyst differ, because of their separate locations within the engine treatment system, e.g., the NOx absorber is often located closer to the engine and will increase in temperature at a faster rate than the SCR catalyst located downstream. This temperature difference between the two catalytic components often results in the premature release of NOx gases from the NOx absorber before the SCR catalyst has reached optimal operating temperature to carry out efficient NOx conversion.

In addition, the presence of minor amounts of sulfur-containing impurities in the diesel or gasoline fuel significantly affects the catalytic activity of NOx absorbers. Oxidation catalysts located upstream of the NOx absorber in an engine treatment system can oxidize sulfur dioxide ($SO_2$) in the exhaust gas to sulfur trioxide ($SO_3$), which exacerbates sulfur poisoning. Alkaline earth metal sulfates (e.g., barium oxide or barium carbonate react with sulfur trioxide ($SO_3$) to form barium sulfate ($BaSO_4$)) are formed upon contact of the oxygenated sulfur compounds with the surface of the NOx absorber. Unfortunately, these alkaline earth metal sulfates are more stable than the alkaline earth metal nitrates (e.g., $Ba(NO_3)_2$) produced upon contact with NOx gases and thus require higher temperatures (>650° C.) for removal from the NOx absorber using desulfation methods. The extreme conditions required for desulfation can lead to a shortened lifetime of the NOx absorber.

Due to emission regulations becoming increasingly more stringent, it would be highly desirable to provide an emission treatment system comprising a sulfur-resistant NOx absorber, which would essentially exhibit the same operating temperature as the SCR catalyst to provide efficient NOx conversion (e.g., of the NOx released from the NOx absorber absorbed during cold start) in combination with a SCR catalyst.

SUMMARY OF THE INVENTION

The invention relates to a catalytic article having a selective catalytic reduction (SCR) catalyst composition and a nitrogen oxides (NOx) absorber composition disposed on the same substrate in a layered or zoned configuration. Integrating a NOx absorber composition into a SCR catalytic article ensures that the SCR catalyst composition has an operating temperature at least as hot as the NOx absorber composition. Thus, any premature release of NOx from the NOx absorber composition before the SCR catalyst composition has reached its optimal operating temperature would be minimized. For this reason, some of the engine treatment systems may mount the SCR catalytic article of the invention as close to the engine exhaust outlet as possible to take advantage of the exhaust heat, which allows the article to heat up faster. Integrating the NOx absorber composition into the SCR catalytic article of the invention removes the need for a separate catalyst brick for the NOx absorber, which would otherwise be located upstream of the SCR catalytic article. In addition, the NOx absorber composition does not interfere with the catalytic activity of the SCR catalyst composition, e.g., the NOx absorber composition does not oxidize the ammonia reductant used in the SCR process. Ammonia actually provides protection of the NOx absorber composition from minor sulfur-containing impurities present in the fuel against sulfur poisoning, by forming ammonium sulfates, thus preventing the sulfate species in the exhaust from reacting with the SCR catalyst composition or the NOx absorber composition.

An aspect of the invention relates to a catalytic article comprising a substrate having both a selective catalytic reduction (SCR) catalyst composition and a nitrogen oxides (NOx) absorber composition disposed thereon. In some embodiments, the selective catalytic reduction (SCR) catalyst composition and the nitrogen oxides (NOx) absorber composition are mixed in a single layer on the substrate. In some embodiments, the selective catalytic reduction (SCR) catalyst composition is in a first layer and the nitrogen oxides (NOx) absorber composition is in a second layer on the substrate, and wherein the second layer is directly on the substrate and the first layer is on top of the second layer. In some embodiments, the selective catalytic reduction (SCR) catalyst composition and the NOx absorber composition are disposed onto the substrate in an axially zoned configuration, wherein the substrate has an axial length with an inlet end and an outlet end, and wherein the second layer is disposed on a first zone extending from the inlet end of the substrate through a range of about 5 to about 95% of the axial length of the substrate.

In some embodiments, the NOx absorber composition is substantially free of platinum. In some embodiments, the NOx absorber composition comprises a platinum group metal component selected from Ru, Pd, Rh and combinations thereof impregnated onto a support material. In some embodiments, the support material is a molecular sieve or a metal oxide. In some embodiments, the molecular sieve is a zeolite and the metal oxide support comprises ceria. In some embodiments, the metal oxide is doped with at least one lanthanide group metal.

In some embodiments, the NOx absorber composition further comprises an alkaline earth metal component. In some embodiments, the alkaline earth metal component comprises a barium component. In some embodiments, the SCR catalyst composition comprises a metal promoted molecular sieve. In some embodiments, the metal is selected from Cu, Co, Ni, La, Mn, Fe, V, Ag, Ce, Nd, Mo, Hf, Y, W, and combinations thereof. In some embodiments, the molecular sieve is a zeolite that optionally has a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI, and combinations thereof.

In some embodiments, the SCR catalyst composition comprises a mixed metal oxide component that optionally is selected from $FeTiO_3$, $FeAl_2O_3$, $MgTiO_3$, $MgAlO_3$, $MnO_x/TiO_2$, $CuTiO_3$, $CeZrO_2$, $TiZrO_2$, $V_2O_5/TiO_2$, $TiO_2/Sb_2O_3$, and mixtures thereof. In some embodiments, the mixed metal oxide component comprises titania and vanadia. In some embodiments, the substrate is a honeycomb substrate selected from the group consisting of a flow-through substrate or a wall flow filter. In some embodiments, the NOx absorber composition does not substantially oxidize ammonia. In some embodiments, the catalytic article is effective to abate NOx from an engine exhaust gas stream Another aspect of the invention relates to a method for treating an exhaust gas stream comprising contacting the gas with a catalytic article of the invention such that nitrogen oxides (NOx) in the exhaust gas stream are reduced.

Another aspect of the invention relates to an emission treatment system for treatment of an exhaust gas stream, the emission treatment system comprising an engine producing an exhaust gas stream; a catalytic article of the invention positioned downstream from the engine in fluid communication with the exhaust gas stream and adapted for the reduction of NOx within the exhaust stream to form a treated exhaust gas stream; and an injector adapted for the addition of a reductant to the exhaust gas stream located upstream of the catalytic article. In some embodiments, the emission treatment system further comprises one or both of a diesel oxidation catalyst located upstream from the catalytic article, and a soot filter located downstream from the catalytic article.

The present disclosure includes, without limitation, the following embodiments.

Embodiment 1

A catalytic article comprising a substrate having both a selective catalytic reduction (SCR) catalyst composition and a nitrogen oxides (NOx) absorber composition disposed thereon.

Embodiment 2

The catalytic article of the preceding embodiment, wherein the SCR catalyst composition and the NOx absorber composition are mixed in a single layer on the substrate.

Embodiment 3

The catalytic article of any preceding embodiment, wherein the SCR catalyst composition is in a first layer and the NOx absorber composition is in a second layer on the substrate, and wherein the second layer is directly on the substrate and the first layer is on top of the second layer.

Embodiment 4

The catalytic article of any preceding embodiment, wherein the SCR catalyst composition and the NOx absorber composition are disposed onto the substrate in an axially zoned configuration, wherein the substrate has an axial length with an inlet end and an outlet end, and wherein the second layer is disposed on a first zone extending from the inlet end of the substrate through a range of about 5 to about 95% of the axial length of the substrate.

Embodiment 5

The catalytic article of any preceding embodiment, wherein the NOx absorber composition is substantially free of platinum.

Embodiment 6

The catalytic article of any preceding embodiment, wherein the NOx absorber composition comprises a platinum group metal (PGM) component selected from Ru, Pd, Rh and combinations thereof impregnated onto a support material.

Embodiment 7

The catalytic article of any preceding embodiment, wherein the support material is a molecular sieve or a metal oxide.

Embodiment 8

The catalytic article of any preceding embodiment, wherein the molecular sieve is a zeolite and the metal oxide support comprises ceria.

Embodiment 9

The catalytic article of any preceding embodiment, wherein the metal oxide is doped with at least one lanthanide group metal.

Embodiment 10

The catalytic article of any preceding embodiment, wherein the NOx absorber composition further comprises an alkaline earth metal component.

Embodiment 11

The catalytic article of any preceding embodiment, wherein the alkaline earth metal component comprises a barium component.

Embodiment 12

The catalytic article of any preceding embodiment, wherein the SCR catalyst composition comprises a metal promoted molecular sieve.

Embodiment 13

The catalytic article of any preceding embodiment, wherein the metal is selected from Cu, Co, Ni, La, Mn, Fe, V, Ag, Ce, Nd, Mo, Hf, Y, W, and combinations thereof.

Embodiment 14

The catalytic article of any preceding embodiment, wherein the metal promoted molecular sieve is a zeolite that optionally has a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI, and combinations thereof.

Embodiment 15

The catalytic article of any preceding embodiment, wherein the SCR catalyst composition comprises a mixed metal oxide component that optionally is selected from $FeTiO_3$, $FeAl_2O_3$, $MgTiO_3$, $MgAlO_3$, $MnO_x/TiO_2$, $CuTiO_3$, $CeZrO_2$, $TiZrO_2$, $V_2O_5/TiO_2$, and mixtures thereof.

Embodiment 16

The catalytic article of any preceding embodiment, wherein the mixed metal oxide component comprises titania and vanadia.

Embodiment 17

The catalytic article according to any preceding embodiment, wherein the substrate is a honeycomb substrate selected from the group consisting of a flow-through substrate and a wall flow filter.

Embodiment 18

The catalytic article of any preceding embodiment, wherein the NOx absorber composition does not substantially oxidize ammonia.

Embodiment 19

The catalytic article of any preceding embodiment, wherein the catalytic article is effective to abate NOx from an engine exhaust gas stream.

Embodiment 20

A method for treating an exhaust gas stream comprising contacting the gas with a catalytic article according to any preceding embodiment, such that NOx in the exhaust gas stream is reduced.

Embodiment 21

An emission treatment system for treatment of an exhaust gas stream, the emission treatment system comprising an engine producing an exhaust gas stream; a catalytic article according to any preceding embodiment positioned downstream from the engine in fluid communication with the exhaust gas stream and adapted for the reduction of NOx within the exhaust stream to form a treated exhaust gas stream; and an injector adapted for the addition of a reductant to the exhaust gas stream positioned upstream of the catalytic article.

Embodiment 22

The emission treatment system of any preceding embodiment, further comprising one or both of a diesel oxidation catalyst located upstream from the catalytic article, and a catalyzed soot filter located downstream from the catalytic article.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
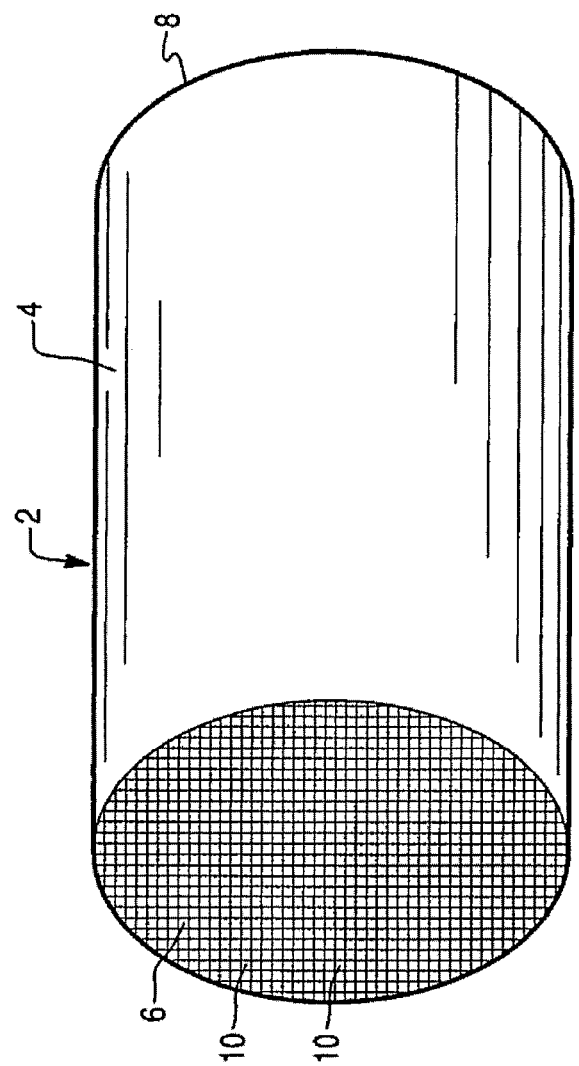
FIG. 1 is a perspective view of a honeycomb-type substrate which may comprise a catalytic article washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The invention relates to a catalytic article having a selective catalytic reduction (SCR) catalyst composition and a nitrogen oxides (NOx) absorber composition disposed on the same substrate. Integrating a NOx absorber composition into a SCR catalytic article provides the same operating temperature for both catalytic components. This ensures that the SCR catalyst composition is at least the same temperature as the NOx absorber composition. The NOx absorber composition can be designed to release NOx at a temperature at which the SCR catalyst composition is active and, thus, prevents premature release of NOx from the NOx absorber composition before the SCR catalyst composition has reached its optimal operating temperature. As mentioned previously, the SCR catalyst composition does not exhibit efficient catalytic activity at low operating temperatures (e.g., below 200° C.) and the engine exhaust gas is primarily treated during this time by the NOx absorber composition, which removes NOx from the exhaust gas stream by absorbing and storing it. As the engine warms up and the temperature of the engine exhaust gas increases the operating temperature of the NOx absorber composition and the SCR catalyst composition of the invention increase at substantially the same rate. Thus, when elevated temperatures are reached the NOx absorber composition releases NOx, which is immediately converted by the SCR catalyst composition located in close proximity using ammonia as a reductant. The catalytic activity of the SCR catalyst composition is not affected by the NOx absorber composition being located on the same substrate (e.g., in a zoned or layered configuration). In particular, the NOx absorber composition of the invention is inert to the presence of ammonia and does not react with ammonia, e.g., oxidize ammonia, to interfere with the SCR process. The presence of ammonia actually provides beneficial effects for the NOx absorber composition from minor sulfur-containing impurities present in the fuel. Without intending to be bound by theory, it is thought that any oxygenated sulfur-containing impurities (e.g., sulfur trioxide species) are able to react with ammonia to form ammonium sulfates, which readily decompose back to sulfur trioxide and ammonia at higher temperatures. In particular, at low operating temperatures when the SCR catalyst composition has a high storage capacity for ammonia, any sulfur trioxide species in the engine exhaust gas would be able to react with the absorbed ammonia prior to contacting the NOx absorber composition, particularly if the SCR catalyst composition was layered over the NOx absorber composition on the same substrate. Such a layered configuration would protect the NOx absorber composition from any contact with sulfur-containing minor impurities such as sulfur trioxide that could poison the catalyst composition.

As used herein, the term "catalyst" or "catalyst composition" refers to a material that promotes a reaction.

As used herein, the term "absorber" refers to material that reacts with a gaseous species to form a chemically adsorbed species, a surface complex, or compound that can be readily converted back to the original gaseous species by some combination of elevated temperature and/or changes in the gas composition, e.g., by changing the exhaust gas composition from net lean to net rich.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a mixture of gaseous constituents, such as the exhaust of a combustion engine, which may also contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen (NOx), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a platinum group metal component is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate. A catalytic article may also comprise predominately catalyst compositions formed into monolithic honeycombs or other solid shapes for use in pack bed reactors.

As used herein, "impregnated" or "impregnation" refers to permeation of the catalytic material into the porous structure of the support material.

The term "abatement" means a decrease in the amount, caused by any means.

SCR Catalyst Composition

The SCR catalyst composition of the invention comprises a mixed metal oxide component or a metal promoted molecular sieve. For SCR catalyst compositions comprising a mixed metal oxide component, the term "mixed metal oxide component" as used therein refers to an oxide that contains cations of more than one chemical element or cations of a single element in several states of oxidation. In one or more embodiments, the mixed metal oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina (e.g. $MnO_x/Al_2O_3$), Mn/titania (e.g. $MnO_x/TiO_2$), Cu/titania (e.g. $CuTiO_3$), Ce/Zr (e.g. $CeZrO_2$), Ti/Zr (e.g. $TiZrO_2$), Ti/Sb (e.g., $TiO_2/Sb_2O_3$), vanadia/titania (e.g. $V_2O_5/TiO_2$), and mixtures thereof. In some embodiments, the mixed metal oxide component comprises vanadia/titania. In some embodiments, the amount of vanadia present in the mixed metal oxide component ranges from about 1% to about 10% by weight based on the total weight of the mixed metal oxide component (no more than about 10%, about 9%, about 8%, about 7%, about 6%, about 5%, about 4%, about 3%, about 2%, or about 1% by weight based on the total weight of the mixed metal oxide component, with a lower boundary of 0%). In some embodiments, the mixed metal oxide component can be activated or stabilized. For example, in some embodiments, the vanadia/titania oxide can be activated or stabilized with tungsten (e.g. $WO_3$) to provide $V_2O_5/TiO_2/WO_3$. In some embodiments, the amount of tungsten present in the mixed metal oxide component (e.g., $V_2O_5/TiO_2/WO_3$) ranges from about 0.5% to about 10% by weight based on the total weight of the mixed metal oxide component (no more than about 10%, about 9%, about 8%, about 7%, about 6%, about 5%, about 4%, about 3%, about 2%, or about 1% by weight based on the total weight of the mixed metal oxide component, with a lower boundary of 0%). In some embodiments, the vanadia is activated or stabilized with tungsten (e.g., $WO_3$). The tungsten can be dispersed at concentrations ranging from about 0.5% to about 10% by weight based on the total weight of vanadia (no more than about 10%, about 9%, about 8%, about 7%, about 6%, about 5%, about 4%, about 3%, about 2%, or about 1% by weight based on the total weight of vanadia, with a lower boundary of 0%). For examples of mixed metal oxides as SCR catalyst compositions see U.S. Pat. Appl. Pub. No. 2001/0049339 to Schafer-Sindelindger et al.; and U.S. Pat. No. 4,518,710 to Brennan et al.; U.S. Pat. No. 5,137,855 to Hegedus et al.; U.S. Pat. No. 5,476,828 to Kapteijn et al.; U.S. Pat. No. 8,685,882 to Hong et al.; and U.S. Pat. No. 9,101,908 to Jurng et al., which are all incorporated by references herein in their entireties.

For SCR catalyst compositions comprising a metal promoted molecular sieve, the term "molecular sieve" refers to framework materials such as zeolites and other framework materials (e.g., isomorphously substituted materials). Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. According to one or more embodiments, it will be appreciated that by defining the molecular sieves by their framework type, it is intended to include any and all zeolite or isotypic framework materials, such as SAPO, ALPO and MeAPO, Ge-silicates, all-silica, and similar materials having the same framework type.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter. The molar ratio of silica to alumina (SAR) of zeolites, as well as other molecular sieves, can vary over a wide range, but is generally 2 or greater. In one or more embodiments, the molecular sieve has a SAR molar ratio in the range of about 2 to about 300, including about 5 to about 250, about 5 to about 200, about 5 to about 100, and about 5 to about 50. In one or more specific embodiments, the molecular sieve has a SAR molar ratio in the range of about 10 to about 200, about 10 to about 100, about 10 to about 75, about 10 to about 60, and about 10 to about 50, about 15 to about 100, about 15 to about 75, about 15 to about 60, and about 15 to about 50, about 20 to about 100, about 20 to about 75, about 20 to about 60, and about 20 to about 50.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. The term "aluminophosphates" refers to another specific example of a molecular sieve, including aluminum and phosphate atoms. Aluminophosphates are crystalline materials having rather uniform pore sizes.

In one or more embodiments, the molecular sieve, independently, comprises $SiO_4/AlO_4$ tetrahedra that are linked by common oxygen atoms to form a three-dimensional network. In other embodiments, the molecular sieve comprises $SiO_4/AlO_4/PO_4$ tetrahedra. The molecular sieve of one or more embodiments can be differentiated mainly according to the geometry of the voids which are formed by the rigid network of the $SiO_4/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 12, including 6, 8, 10, and 12.

According to one or more embodiments, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In some embodiments, a molecular sieve comprises a framework structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI.

In one or more embodiments, the molecular sieve comprises an 8-ring small pore aluminosilicate zeolite. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. In one or more embodiments, the molecular sieve is a small pore molecular sieve having a maximum ring size of eight tetrahedral atoms.

As noted above, in one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44, Ti-SAPO-34, and CuSAPO-47.

As referenced herein above, the disclosed SCR catalyst composition generally comprises molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper participates in the conversion of nitrogen oxides and thus may be a particularly useful metal for exchange. Accordingly, in particular embodiments, a catalyst composition is provided which comprises a copper-promoted molecular sieve, e.g., Cu-CHA. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Further promoter metals that can, in various embodiments, be used to prepare metal-promoted molecular sieves include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-CHA.

The promoter metal content of a metal-promoted molecular sieve, calculated as the oxide, in one or more embodiments, ranges from about 0.1 wt. % to about 10 wt. %, from about 0.1 wt. % to about 5 wt. %, from about 0.5 wt. % to about 4 wt. %, from about 2 wt. % to about 5 wt. %, or from about 1 wt. % to about 3 wt. % based on the total weight of the calcined molecular sieve (including promoter) and reported on a volatile-free basis. In some embodiments, the promoter metal of the molecular sieve comprises Cu, Fe, or a combination thereof.

For examples of SCR catalyst compositions comprising metal-promoted molecular sieves see, U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; and U.S. Pat. No. 7,220,692 to Marshall et al., which are all incorporated by references herein in their entireties.

NOx Absorber Composition

The NOx absorber composition of the invention comprises a platinum group metal component impregnated onto a support material. As used herein, "platinum group metal component" or "PGM component" refers to platinum group metals or oxides thereof, including palladium (Pd), ruthenium (Ru), rhodium (Rh), osmium (Os), iridium (Ir), and mixtures thereof. The concentration of platinum group metal component can vary, but will typically be from about 0.01 wt. % to about 10 wt. % relative to the total weight of the impregnated metal oxide support. In some embodiments, the NOx adsorber composition is substantially free of platinum. As used herein, the term "substantially free of platinum" means that there is no additional platinum intentionally added to the NOx absorber composition, and that there is less than about 0.01 wt. % of platinum metal by weight present in the NOx absorber composition. In some embodiments, the NOx absorber composition expressly excludes platinum. In other embodiments, the platinum group metal component comprises two platinum group metals, e.g., in a weight ratio of about 1:10 to about 10:1. For example, in some embodiments, the platinum group metal component comprises ruthenium and palladium.

The platinum group metal component can be supported on any suitable material. In some embodiments, the support material is a metal oxide support. As used herein, "metal oxide support" refers to metal-containing oxide materials exhibiting chemical and physical stability at high temperatures, such as the temperatures associated with diesel engine exhaust. Exemplary metal oxides include, but are not limited to, ceria, alumina, silica, zirconia, titania, or combinations thereof. For example, in some embodiments, metal oxides alumina, silica, zirconia, or titania, can be combined as physical mixtures or chemical combinations with ceria to form the metal oxide support. In some embodiments, the metal oxide support comprises greater than 50% by weight ceria based on the total weight of the NOx adsorber composition. In further embodiments, the metal oxide support comprises greater than about 60%, than about 70%, than about 80%, or greater than about 90% by weight ceria based on the total weight of the NOx adsorber composition. In additional embodiments, the metal oxide support comprises from about 50% to about 99.9%, from about 60% to about 99.5%, or from about 80% to about 99.0% by weight ceria based on the total weight of the NOx adsorber composition.

In some embodiments, the metal oxide support comprises atomically-doped combinations of metal oxides. For example, in some embodiments, the metal oxide support is modified to contain a dopant metal in oxide form, such as, but not limited to, a lanthanide group metal or metals selected from La, Pr, Nd, Pm, Sm, Eu, Gd, Tb, Dy, Ho, Er, Tm, Yb, Lu, Si, Nb, Zr and a combination thereof. In some embodiments, the dopant metal is Pr, Gd, Zr, or a combination thereof. In some embodiments, the total amount of the dopant metal or combination thereof ranges from about 0.1% to about 15% by weight based on the total weight of the NOx absorber composition. Exemplary metal oxide include but is not limited to mixtures of two metal oxides such as alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

In some embodiments, the support material is a molecular sieve, e.g., a zeolite. In some embodiments, the NOx absorber composition further comprises an alkaline earth metal component. As used herein, the term "alkaline earth metal component" refers to one or more chemical elements defined in the Periodic Table of Elements, including beryllium (Be), magnesium (Mg), calcium (Ca), strontium (Sr), and barium (Ba). In one or more embodiments, the alkaline earth metal component can be incorporated into the NOx absorber composition as a salt and/or oxide (e.g., $BaCO_3$). In one or more embodiments, the alkaline earth metal component comprises barium. The alkaline earth metal component can be present in the NOx absorber composition in an amount of about 1% to about 30%, 1% to about 20%, or 5% to about 10% by weight on an oxide basis.

For additional examples of NOx absorber compositions, see, U.S. Pat. No. 5,750,082 to Hephurn et al.; U.S. Pat. No. 8,105,559 to Melville et al.; U.S. Pat. No. 8,475,752 to Wan et al.; U.S. Pat. No. 8,592,337 to Holgendorff et al.; U.S. Pat. No. 9,114,385 to Briskley et al.; U.S. Pat. No. 9,486,791 to Swallow et al.; U.S. Pat. No. 9,610,564 to Xue et al.; U.S. Pat. No. 9,662,611 to Wan et al.; U.S. Patent Application Nos. 2002/0077247 to Bender et al.; 2011/0305615 to Hilgendorff et al.; 2015/0157982 to Rajaram et al.; 2015/0158019 to Rajaram et al.; 2016/0228852 to Biberger et al.; and International Patent Application WO 2016/141142 to Grubert et al., which are incorporated by reference in their entireties.

Substrate

The substrate for the catalytic article of the invention may be constructed of any material typically used for preparing automotive catalysts and will typically comprise a metal or ceramic honeycomb structure. The substrate typically provides a plurality of wall surfaces upon which the catalytic article washcoat composition is applied and adhered, thereby acting as a carrier for the one or more catalyst compositions.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface of the metal substrate may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, a alumina, aluminosilicates and the like.

In some embodiments, the substrate may be constructed of one or more catalyst compositions forming a honeycomb structure or any other solid shape, e.g., any solid shape that can be used in pack bed reactors. For example, the substrate may be constructed of a first catalyst composition, which is coated with a washcoat composition comprising a second catalyst composition. In another example the first and second catalyst composition can be co-extruded to form the substrate.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 2:
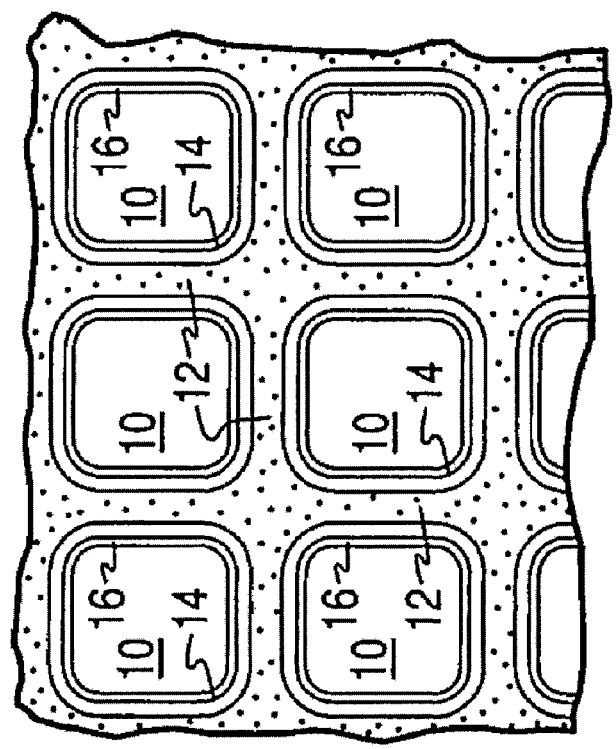
FIG. 2 is a partial cross-sectional view enlarged relative to FIG. 1 and taken along a plane parallel to the end faces of the substrate of FIG. 1 representing a monolithic flow-through substrate, which shows an enlarged view of a plurality of the gas flow passages shown in FIG. 1.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the substrate member and a second discrete top washcoat layer 16 coated over the bottom washcoat layer 14. The present invention can be practiced with one or more (e.g., 2, 3, or 4) washcoat layers and is not limited to the illustrated two-layer embodiment. Alternatively, the catalyst compositions of the invention (i.e., SCR catalyst composition and NOx absorber composition) could be homogenously mixed in the same washcoat layer.

For example, in one embodiment, a catalytic article comprises a catalytic material with multiple layers, wherein each layer has a different catalyst composition. The bottom layer (e.g., layer 14 of FIG. 2) can comprise a NOx absorber composition of the invention and the top layer (e.g., layer 16 of FIG. 2) can comprise a SCR catalyst composition of the invention. In some embodiments, the catalytic article comprises a catalytic material, wherein the bottom layer (e.g., layer 14 of FIG. 2) can comprise a SCR catalyst composition of the invention and the top layer (e.g., layer 16 of FIG. 2) can comprise a NOx absorber composition of the invention.

In another example, a catalytic article comprises a catalytic material with one or more layers, wherein the substrate is constructed of one or more catalyst compositions. In one embodiment, the substrate is constructed of a NOx absorber composition of the invention coated with a washcoat composition comprising a SCR catalyst composition of the invention. In some embodiments, more than one layer of the SCR catalyst composition of the invention is applied to the substrate (e.g., layers 14 and 16 of FIG. 2).

In another example, the substrate is constructed of a SCR catalyst composition of the invention coated with a washcoat composition comprising a NOx absorber composition of the invention. In some embodiments, more than one layer of the NOx absorber composition of the invention is applied to the substrate (e.g., layers 14 and 16 of FIG. 2).

In another example, the substrate is constructed by co-extruding a SCR catalyst composition and a NOx absorber composition of the invention and is not coated with a washcoat composition.

The relative amount of the SCR catalyst composition and the NOx absorber composition can vary. For example, the relative amount of PGM component in the NOx absorber composition in an exemplary dual layer coating can comprise about 10-90% by weight based on the total weight of NOx absorber composition in the bottom layer (adjacent to the substrate surface) and the SCR catalyst composition is present about 10-90% by weight based on the total weight of the SCR catalyst composition in the top layer respectively. The same percentages could apply if the SCR catalyst composition is in the bottom layer and the NOx absorber composition is on the top layer.

Figure 3:
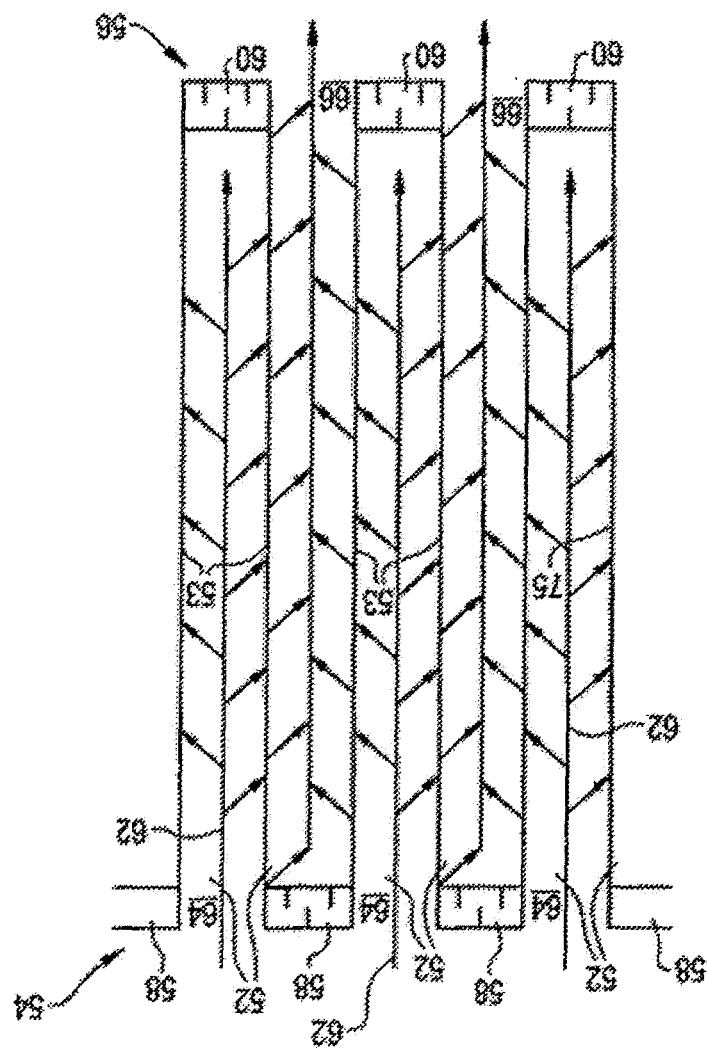
FIG. 3 is a cutaway view of a section enlarged relative to FIG. 1, wherein the honeycomb-type substrate in FIG. 1 represents a wall flow filter substrate monolith.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Figure 4:
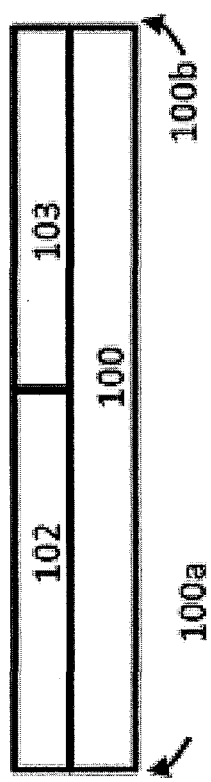
FIG. 4 shows a cross-sectional view of a zoned catalytic article of the present invention.

In some embodiments, the substrate can be coated with at least two layers contained in separate washcoat slurries in an axially zoned configuration. For example, the same substrate can be coated with a washcoat slurry of one layer and a washcoat slurry of another layer, wherein each layer is different. This may be more easily understood by reference to FIG. 4, which shows an embodiment in which the first washcoat zone 102 and the second washcoat zone 103 are located side by side along the length of the substrate 100. The first washcoat zone 102 of specific embodiments extends from the front or inlet end 100a of the substrate 100 through the range of about 5% to about 95%, from about 5% to about 75%, from about 5% to about 50%, or from about 10% to about 35% of the length of the substrate 100. The second washcoat zone 103 extends from the rear or outlet end 100b of the substrate 100 from about 5% to about 95%, from about 5% to about 75%, from about 5% to about 50%, or from about 10% to about 35% of the total axial length of the substrate 100. The catalyst compositions of at least two components within a treatment system as described in the current invention can be zoned onto the same substrate. In some embodiments, the NOx absorber composition and the SCR catalyst composition are zoned onto the same substrate. For example referring back to FIG. 4, the first washcoat zone 102 represents the NOx absorber composition and extends from the front or inlet end 100a of the substrate through the range of about 5% to about 95% of the length of the substrate 100. Hence, the second washcoat zone 103 comprising the SCR catalyst composition is located side by side to zone 102 extending from the rear or outlet 100b of the substrate 100. In another embodiment, the first washcoat zone 102 can represent the SCR catalyst composition and the second washcoat zone 103 can comprise the NOx absorber composition.

Figure 5:
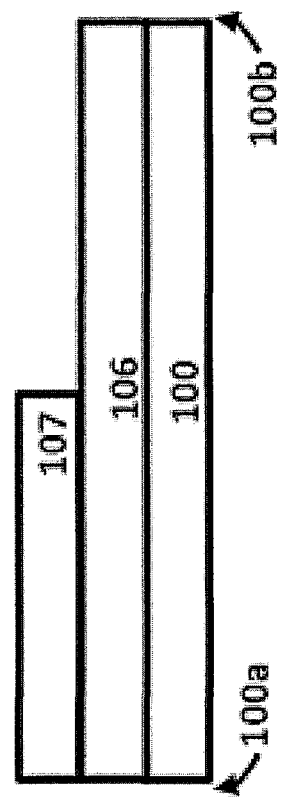
FIG. 5 shows a cross-sectional view of a layered catalytic article of the invention, wherein an outer layer (107) is disposed on a portion of an inner layer (106), which is directly disposed over the entire length of a substrate (100)

In some embodiments, as seen in FIG. 5, a substrate 100 can be coated with a first coating layer 106 extending from the front or inlet end 100a of the substrate 100 to the rear or outlet end 100b of the substrate 100 and a second coating layer 107 that is coated over the first coating layer 106 proximate the front or inlet end 100a of the substrate 100 and extending across only a partial length of the substrate 100 (i.e., terminating before reaching the rear or outlet end 100b of the substrate 100). In some embodiments, the first coating layer 106 can comprise the SCR catalyst composition and the second coating layer 107 can comprise NOx absorber composition. In another embodiment, the first coating layer can comprise the NOx absorber composition and the second coating layer can comprise the SCR catalyst composition.

Figure 6:
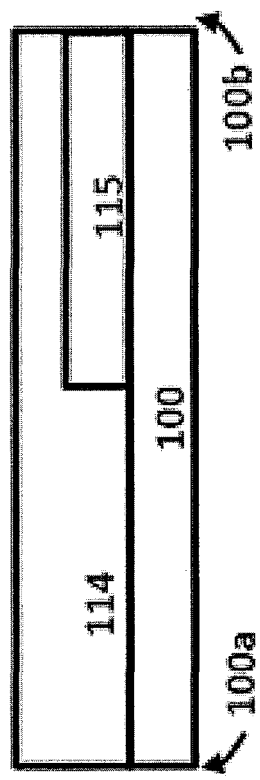
FIG. 6 shows a cross-sectional view of a layered catalytic article of the invention, wherein an inner layer (115) is disposed on a portion of a substrate (100) and an outer layer (114) is disposed on the remaining portion of the substrate (100) and on top of the inner layer (115)

In some embodiments, as seen in FIG. 6, a substrate 100 can be coated with a first coating layer 115 proximate the rear or outlet end 100b of the substrate 100 and extending only partially along the length of the substrate 100 (i.e., terminating before reaching the front or inlet end 100a of the substrate 100). The substrate 100 can be coated with a second coating layer 114. As seen in FIG. 6, the second coating layer 114 extends from the front or inlet end 100a of the substrate 100 to the rear or outlet end 100b of the substrate 100 (and thus is coated completely over the first coating layer 115). In some embodiments, the first coating layer 115 can comprise the NOx absorber composition and the second coating layer 114 can comprise the SCR catalyst composition. In another embodiment, the first coating layer can comprise the SCR catalyst composition and the second coating layer can comprise the NOx absorber composition. It is understood that the embodiments above provided as examples, and further combinations of catalytic coatings are encompassed.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalytic article (i.e., NOx absorber composition and the SCR catalyst composition) on the substrate is typically from about 0.5 to about 6 g/in$^3$, more typically from about 1 to about 5 g/in$^3$, or from about 1 to about 3 g/in$^3$. The total loading of the PGM without support material (e.g., PGM component only) is typically in the range from about 0.1 to about 200 g/ft$^3$, from about 0.1 to about 100 g/ft$^3$, about 1 to about 50 g/ft$^3$, from about 1 to about 30 g/ft$^3$, or from about 5 to about 25 g/ft$^3$ for the catalytic article. It is noted that these weights per unit volume are typically calculated by weighing the substrate before and after treatment with the catalyst washcoat composition, and since the treatment process involves drying and calcining the substrate at high temperature, these weights represent an essentially solvent-free catalyst coating as essentially all of the water of the washcoat slurry has been removed.

In some embodiments, the catalytic material on the filter of the CSF disclosed herein comprises two or more catalyst compositions (e.g., the selective oxidation catalyst composition and SCR material), wherein the catalyst compositions are different. Such catalyst compositions are contained in separate washcoat slurries when coating the wall-flow filter, e.g., in an axially zoned configuration, wherein the wall-flow filter is coated with a washcoat slurry of one catalyst composition and a washcoat slurry of another catalyst composition. This may be more easily understood by reference to FIG. 3, which shows an embodiment of a zoned coated wall-flow filter 20 in which the first washcoat zone 24 and the second washcoat zone 26 are located side by side along the length of the substrate 28, which has an upstream end 25 and a downstream end 27. In this zoned configuration, the first washcoat zone 24 is located upstream of the second washcoat zone 26 (or the second washcoat zone 26 is located downstream of the first washcoat zone 24).

For example, in some embodiments, the catalytic material of the catalyzed soot filter comprises a selective oxidation catalyst composition and a second SCR material, which are disposed on the substrate in an axially zoned configuration. In some embodiments, the washcoat zone 24 represents the selective oxidation catalyst composition disclosed herein and the second washcoat zone 26 represents the second SCR material disclosed herein to render a catalyzed soot filter, wherein the second SCR material is disposed downstream of the selective oxidation catalyst composition. In another embodiment, the first washcoat zone 24 represents the second SCR material disclosed herein and the second washcoat zone 26 represents the selective oxidation catalyst composition disclosed herein, providing a catalyzed soot filter, wherein the selective oxidation catalyst composition is disposed downstream of the second SCR material.

In another example, the catalytic material of the catalyzed soot filter comprises a selective oxidation catalyst composition and a second SCR material mixed in the same washcoat and disposed on the substrate in a layered configuration.

Method of Making the Catalyst Composition

Preparation of the PGM component-impregnated support material for the NOx absorber composition typically comprises impregnating the support material in particulate form with an active metal solution, such as a palladium and/or ruthenium precursor solution. The active metal can be impregnated into the same support particles or separate support particles using an incipient wetness technique. In some embodiment the support material is a metal oxide support.

Incipient wetness impregnation techniques, also called capillary impregnation or dry impregnation are commonly used for the synthesis of heterogeneous materials, e.g., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

The support particles are typically dry enough to absorb substantially all of the solution to form a moist solid. Aqueous solutions of water soluble compounds or complexes of the active metal (i.e., PGM component) are typically utilized, such as ruthenium chloride, ruthenium nitrate (e.g., Ru (NO) and salts thereof), hexaammine ruthenium chloride, or combinations thereof. An aqueous solution of water soluble compounds having palladium as the active metal comprises metal precursors such as palladium nitrate, palladium tetraamine, palladium acetate, or combinations thereof.

Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation. For additional examples of the preparation of NOx absorber compositions, see, U.S. Pat. No. 5,472,673 to Goto et al.; U.S. Pat. No. 5,599,758 to Guth et al.; U.S. Pat. No. 5,750,082 to Hepburn et al.; U.S. Pat. No. 8,105,559 to Melville et al.; U.S. Pat. No. 8,475,752 to Wan et al.; U.S. Pat. No. 8,592,337 to Holgendorff et al.; U.S. Pat. No. 9,114,385 to Briskley et al.; U.S. Pat. No. 9,486,791 to Swallow et al.; U.S. Pat. No. 9,610,564 to Xue et al.; U.S. Pat. No. 9,662,611 to Wan et al.; U.S. Patent Application Nos. 2002/0077247 to Bender et al.; 2011/0305615 to Hilgendorff et al.; 2015/0157982 to Rajaram et al.; 2015/0158019 to Rajaram et al.; 2016/0228852 to Biberger et al.; and International Patent Application WO 2016/141142 to Grubert et al., which are incorporated herein by reference in their entireties.

Preparation of metal-promoted molecular sieves for SCR catalyst compositions of the invention generally comprise a metal (e.g., copper) ion-exchanged into molecular sieves. The ion-exchange process comprises the molecular sieves in particulate form with a metal precursor solution. For example, a copper salt can be used to provide copper. Such metals are generally ion exchanged into alkali metal or $NH_4$ molecular sieves (which can be prepared by $NH_4^-$ ion exchange into an alkali metal molecular sieve by methods known in the art, e.g., as disclosed in Bleken, F. et al. Topics in Catalysis 2009, 52, 218-228, which is incorporated herein by reference).

For additional promotion of SCR catalyst composition, in some embodiments, the molecular sieves can be promoted with two or more metals (e.g., copper in combination with one or more other metals). Where two or more metals are to be included in a metal ion-promoted molecular sieve material, multiple metal precursors (e.g., copper and iron precursors) can be ion-exchanged at the same time or separately. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be iron or an alkaline earth or alkali metal. Suitable alkaline earth or alkali metals include, but are not limited to, barium, magnesium, beryllium, calcium, strontium, and combinations thereof. For examples of the preparation of SCR catalyst compositions comprising metal-promoted molecular sieves see U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; U.S. Pat. No. 7,220,692 to Marshall et al.; U.S. Pat. No. 4,961,917 to Byrne et al.; U.S. Pat. No. 4,010,238 to Shiraishi et al.; and U.S. Pat. No. 4,085,193 to Nakajima et al., which are incorporated herein by reference in their entireties.

For the preparation of SCR catalyst compositions comprising mixed metal oxides see, for example, U.S. Pat. No. 4,518,710 to Brennan et al.; U.S. Pat. No. 5,137,855 to Hegedus et al.; U.S. Pat. No. 5,476,828 to Kapteijn et al.; U.S. Pat. No. 8,685,882 to Hong et al.; and U.S. Pat. No. 9,101,908 to Jurng et al., which are incorporated herein by references in their entireties.

Substrate Coating Process

The above-noted catalyst compositions are typically prepared in the form of catalyst particles as noted above. These catalyst particles can be mixed with water to form a slurry for purposes of coating a catalyst substrate, such as a honeycomb-type substrate.

In addition to the catalyst particles, the slurry may optionally contain a binder in the form of alumina, silica, Zr acetate, colloidal zirconia, or Zr hydroxide, associative thickeners, and/or surfactants (including anionic, cationic, non-ionic or amphoteric surfactants). Other exemplary binders include bohemite, gamma-alumina, or delta/theta alumina, as well as silica sol. When present, the binder is typically used in an amount of about 1-5 wt. % of the total washcoat loading.

Addition of acidic or basic species to the slurry can be carried out to adjust the pH accordingly. For example, in some embodiments, the pH of the slurry is adjusted by the addition of ammonium hydroxide or aqueous nitric acid. A typical pH range for the slurry is about 3 to 6.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is determined using a dedicated particle size analyzer. The equipment was manufactured by Sympatec in 2010 and uses laser diffraction to measure particle sizes in small volume slurry. The D90, typically with units of microns, means 90% of the particles by number have a diameter less than a quoted value.

The slurry is coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min to about 3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

Emission Treatment System

The present invention also provides an emission treatment system that incorporates the catalytic article described herein. The catalytic article of the invention is typically used in an integrated emissions treatment system comprising one or more additional components for the treatment of exhaust gas emissions, e.g., exhaust gas emissions from a diesel engine. For example, the emission treatment system may further comprise a catalyzed soot filter (CSF) and/or a diesel oxidation catalyst (DOC). The catalytic article of the invention is typically located upstream or downstream from the soot filter and downstream from the diesel oxidation catalyst component, although the relative placement of the various components of the emission treatment system can be varied. The treatment system includes further components, such as reductant injectors for ammonia precursors, and may optionally include any additional particulate filtration components. The preceding list of components is merely illustrative and should not be taken as limiting the scope of the invention.

Figure 7:
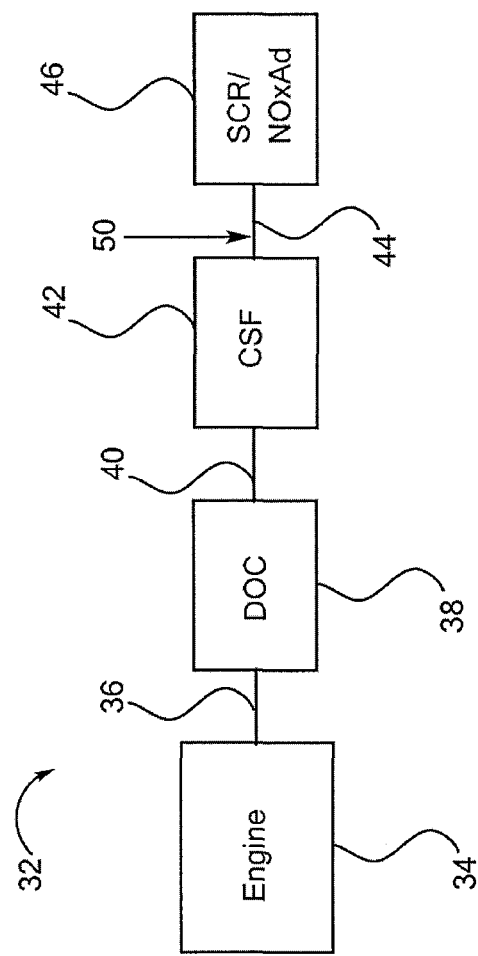
FIG. 7 shows a schematic depiction of an embodiment of an emission treatment system in which a catalytic article of the present invention is utilized, wherein the catalytic article of the present invention is located downstream of a catalyzed soot filter (CSF)

One exemplary emissions treatment system is illustrated in FIG. 7, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38 to a catalyzed soot filter (CSF) 42 to a catalytic article of the invention (i.e., SCR/NOxAd component 46). In the DOC 38, unburned gaseous and non-volatile hydrocarbons (i.e., the SOF) and carbon monoxide are largely combusted to form carbon dioxide and water. In addition, a proportion of the NO of the NOx component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. The CSF 42 can optionally include a SCR catalyst composition for the conversion of NOx present in the exhaust gas.

After removal of particulate matter, via CSF 42, the exhaust gas stream is conveyed via exhaust pipe 44 to a downstream catalytic article of the invention (i.e., SCR/NOxAd component 46) for the further treatment and/or conversion of NOx. The exhaust gas passes through component 46 at a flow rate which allows sufficient time for the catalyst composition to reduce the level of NOx in the exhaust gas at a given temperature. An injector 50 for introducing a nitrogenous reducing agent into the exhaust stream is located upstream of the SCR/NOx component 46. The introduced nitrogenous reducing agent into the gas exhaust stream promotes the reduction of the NOx to $N_2$ and water as the gas is exposed to the catalyst composition in 46. For emission treatment system where CSF 42 already includes an SCR catalyst composition, the injector 50 for introducing the nitrogenous reducing agent into the exhaust stream is located upstream of the CSF 42. Alternatively, for emission systems, which include CSF 42 with an SCR catalyst and a SCR/NOxAd component 46, one and/or two injectors 50 may be included upstream of CSF 42 and/or SCR/NOxAd component 46. The introduced nitrogenous reducing agent into the gas exhaust stream promotes the reduction of the NOx to $N_2$ and water as the gas is exposed to the catalyst composition.

Furthermore, this nitrogenous reducing agent may be introduced into the exhaust gas prior to contacting the SCR/NOxAd component 46 for the treatment of NOx. In general, this reducing agent for SCR processes broadly means any compound that promotes the reduction of NOx in an exhaust gas. Examples of such reductants include ammonia, hydrazine or any suitable ammonia precursor such as urea (($NH_2$)$_2$CO), ammonium carbonate, ammonium carbamate, ammonium hydrogen carbonate, or ammonium formate.

Figure 8:
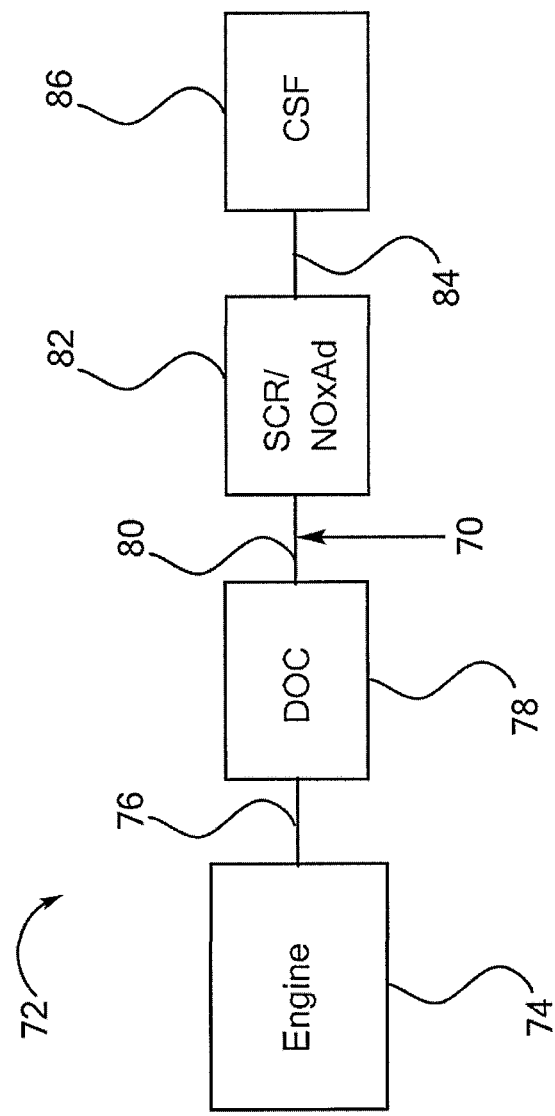
FIG. 8 shows a schematic depiction of an embodiment of an emission treatment system in which a catalytic article of the present invention is utilized, wherein the catalytic article of the present invention is located upstream of a catalyzed soot filter (CSF)

Another exemplary emission treatment system is illustrated in FIG. 8, which depicts a schematic representation of an emission treatment system 72. As shown, an exhaust gas stream is conveyed via exhaust pipe 76 from an engine 74 to a diesel oxidation catalyst (DOC) 78. The exhaust stream is next conveyed via exhaust pipe 80 to a catalytic article of the invention (i.e., SCR/NOxAd component 82) located upstream of a catalyzed soot filter (CSF) 86. The CSF 86 can optionally include a SCR catalyst composition for the conversion of NOx present in the exhaust gas. Next, the exhaust gas stream exits SCR/NOxAd component 82 via exhaust pipe 84, which leads to CSF 86. An injector 70 for introducing a nitrogenous reducing agent into the exhaust stream is located upstream of the SCR/NOxAd component 82. Alternatively, for emission treatment systems, which include CSF 86 with an SCR catalyst and a SCR/NOxAd component 82, one and/or two injectors 70 may be included upstream of CSF 86 and/or SCR/NOxAd component 82.

Figure 9:
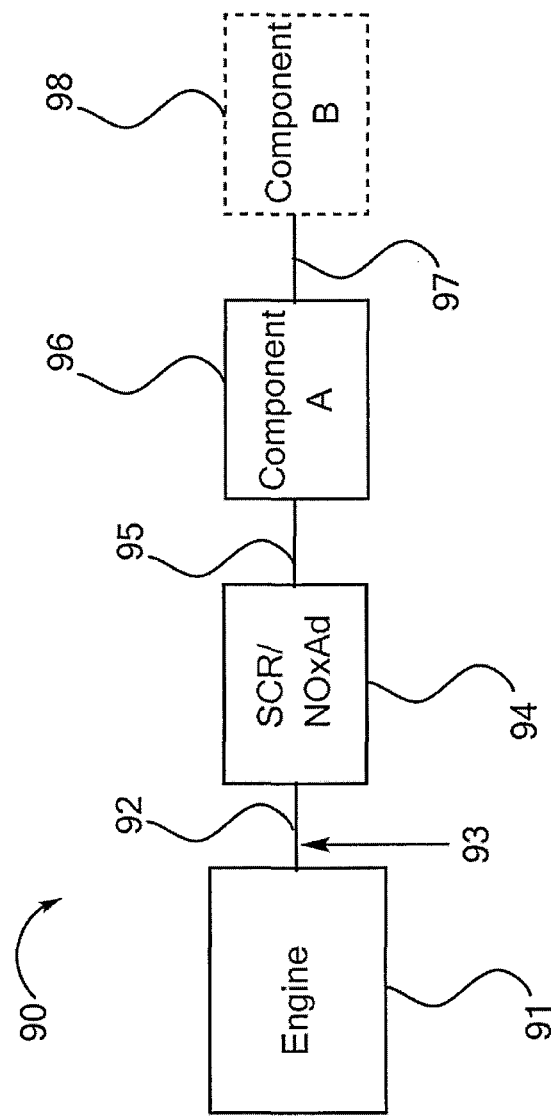
FIG. 9 shows a schematic depiction of an embodiment of an emission treatment system in which a catalytic article of the present invention is utilized, wherein the catalytic article of the present invention is located immediately downstream of the engine.

Another exemplary emission treatment system is illustrated in FIG. 9, which depicts a schematic representation of an emission treatment system 90. As shown, an exhaust gas stream is conveyed via exhaust pipe 92 from an engine 91 to a catalytic article of the invention (i.e., SCR/NOxAd component 94). An injector 93 for introducing a nitrogenous reducing agent into the exhaust stream is located upstream of the SCR/NOxAd component 94. The exhaust stream is next conveyed via exhaust pipe 95 to a catalyst component A (96) located upstream of SCR/NOxAd component 94. The catalyst component A can be, but is not limited to, a diesel oxidation catalyst, a catalyzed soot filter, or a selective catalytic reduction catalyst. Next, the exhaust gas stream exits catalyst component A via exhaust pipe 97, which leads to catalyst component B (98) if present. The presence of catalyst component B is optional and can be, but is not limited to, a catalyzed soot filter, a diesel oxidation catalyst, or a selective catalytic reduction catalyst.

With respect to this SCR process, provided herein is a method for the reduction of NOx in an exhaust gas, which comprises contacting the exhaust gas with the catalytic article of the invention (i.e., a combination of a SCR catalyst and NOx absorber composition) and optionally in the presence of a reductant for a time and temperature sufficient to catalytically reduce NOx thereby lowering the concentration of NOx in the exhaust gas. In certain embodiments, the temperature range is from about 200° C. to about 600° C. The catalytic article of the invention may be fresh or hydrothermally aged. The amount of NOx reduction is dependent upon the contact time of the exhaust gas stream with the catalytic article, and thus is dependent upon the space velocity. The contact time and space velocity is not particularly limited in the present invention. As such, the catalytic article can perform, well even at high space velocity, which is desirable in certain applications. In some embodiments, the amount of NOx (i.e., a mixture of NO and $NO_2$) in the exhaust gas stream converted into nitrogen and water ranges from about 50% to about 99.9%, preferably from about 75% to about 99.9% by weight based on the total amount of NOx present in the exhaust gas stream. The amount of NOx converted can be, in some embodiments, at least 50%, 60%, 70%, 80%, 90%, or 95% by weight based on the total amount of NOx present in the exhaust gas stream, with each value being understood to have an upper boundary of 100%.

In some embodiments, a method for the reduction of NOx in an exhaust gas comprises contacting the exhaust gas with the catalytic article of the invention, wherein a SCR catalyst composition and a NOx absorber composition are disposed on the same substrate such that both compositions are at substantially the same operating temperature. The amount of NOx level reduced by the catalytic article of the invention is higher compared to a combination of catalytic articles having the same NOx absorber composition and SCR catalyst composition disposed on separate substrates.

With respect to the process of absorbing and releasing NOx of the catalytic article of the invention, provided is a method for absorbing NOx (NO, $NO_2$, or mixtures thereof) in an exhaust gas stream. Such methods can comprise contacting the gas stream with a NOx adsorber composition as described herein for a time and temperature sufficient to reduce the level of NOx in the exhaust gas stream. In some embodiments, the amount of NOx absorbed from the exhaust gas stream is about 15% to about 99.9%, preferably from about 30% to about 99.9% by weight based on the total amount of NOx present in the exhaust gas stream. The amount of NOx absorbed can be, in some embodiments, at least 15%, 25%, 35%, 45%, 55%, 65%, 75%, 85%, or 95% by weight based on the total amount of NOx present in the exhaust gas stream, with each value being understood to have an upper boundary of 100%. In some embodiments the temperature is below about 200° C., below about 150° C., or below about 100° C.

Another aspect of the current invention is directed towards a method for releasing NOx (i.e., a mixture of NO and $NO_2$) from a NOx absorber composition back into the exhaust gas stream at a temperature sufficient for the SCR catalyst composition (located on the same substrate as the NOx absorber composition in the exhaust gas treatment system) to convert NO to $N_2$. In some embodiments, the amount of NO released back into the exhaust gas stream is at least about 55% to about 100%, or at least about 75% to about 100% (or at least about 55%, at least about 65%, at least about 75%, at least about 85%, at least about 95%, or at least about 99.9%) by weight based on the total amount of NO adsorbed onto the NOx adsorber. In some embodiments, the temperature for release of NO from the NOx absorber composition ranges from about 170° C. to about 350° C., preferably about 250° C. to about 350° C.

That which is claimed is:

1. A catalytic article comprising:
a substrate having both a selective catalytic reduction (SCR) catalyst composition and a nitrogen oxides (NOx) absorber composition disposed thereon;
wherein:
the NOx absorber composition comprises an alkaline earth metal component; and
the SCR catalyst composition comprises a mixed metal oxide component that is selected from the group consisting of $FeTiO_3$, $FeAl_2O_3$, $MgTiO_3$, $MgAlO_3$, $MnOx/TiO_2$, $CuTiO_3$, $CeZrO_2$, $TiZrO_2$, $V_2O_5/TiO_2$, and mixtures thereof.

2. The catalytic article of claim 1, wherein the SCR catalyst composition and the NOx absorber composition are mixed in a single layer on the substrate.

3. The catalytic article of claim 1, wherein the SCR catalyst composition is in a first layer and the NOx absorber composition is in a second layer on the substrate, and wherein the second layer is directly on the substrate and the first layer is on top of the second layer.

4. The catalytic article of claim 3, wherein the SCR catalyst composition and the NOx absorber composition are disposed onto the substrate in an axially zoned configuration, wherein the substrate has an axial length with an inlet end and an outlet end, and wherein the second layer is disposed on a first zone extending from the inlet end of the substrate through a range of about 5 to about 95% of the axial length of the substrate.

5. The catalytic article of claim 1, wherein the NOx absorber composition is substantially free of platinum.

6. The catalytic article of claim 1, wherein the NOx absorber composition comprises a platinum group metal (PGM) component selected from Ru, Pd, Rh and combinations thereof impregnated onto a support material.

7. The catalytic article of claim 6, wherein the support material is a molecular sieve or a metal oxide.

8. The catalytic article of claim 7, wherein the molecular sieve is a zeolite and the metal oxide support comprises ceria.

9. The catalytic article of claim 8, wherein the metal oxide is doped with at least one lanthanide group metal.

10. The catalytic article of claim 1, wherein the alkaline earth metal component comprises a barium component.

11. The catalytic article according to claim 1, wherein the SCR catalyst composition comprises a metal promoted molecular sieve.

12. The catalytic article of claim 11, wherein the metal is selected from Cu, Co, Ni, La, Mn, Fe, V, Ag, Ce, Nd, Mo, Hf, Y, W, and combinations thereof.

13. The catalytic article of claim 11, wherein the metal promoted molecular sieve is a zeolite that optionally has a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RLE, RTH, SAS, SAT, SAY, SFW, TSC, and UFI, and combinations thereof.

14. The catalytic article of claim 1, wherein the mixed metal oxide component comprises titania and vanadia.

15. The catalytic article of claim 1, wherein the substrate is a honeycomb substrate selected from the group consisting of a flow-through substrate and a wall flow filter.

16. The catalytic article of claim 1, wherein the NOx absorber composition does not substantially oxidize ammonia.

17. The catalytic article according to claim 1, wherein the catalytic article is effective to abate NOx from an engine exhaust gas stream.

18. A method for treating an exhaust gas stream comprising contacting the gas with a catalytic article according to claim 1 such that NOx in the exhaust gas stream is reduced.

19. An emission treatment system for treatment of an exhaust gas stream, the emission treatment system comprising:
- an engine producing an exhaust gas stream;
- a catalytic article according to claim 1 positioned downstream from the engine in fluid communication with the exhaust gas stream and adapted for the reduction of NOx within the exhaust stream to fora treated exhaust gas stream; and
- an injector adapted for the addition of a reductant to the exhaust gas stream positioned upstream of the catalytic article.

20. The emission treatment system of claim 19, further comprising one or both of a diesel oxidation catalyst located upstream from the catalytic article, and a catalyzed soot filter located downstream from the catalytic article.

* * * * *